United States Patent Office 3,687,670
Patented Aug. 29, 1972

3,687,670
PHOTOGRAPHIC ELEMENT CONTAINING
COLORED COLLOID LAYERS
Guy Alfred Rillaers, Kontich, Henri Depoorter, Mortsel, and Felix Jan Moelants, Wilrijk, Belgium, assignors to Gevaert-Agfa N.V., Mortsel, Belgium
Filed May 13, 1969, Ser. No. 824,079
Claims priority, application Great Britain, May 21, 1968, 24,069/68
Int. Cl. G03c 1/84
U.S. Cl. 96—84
8 Claims

ABSTRACT OF THE DISCLOSURE

Light-screening dyes are provided for use as filter dyes and anti-halation dyes in photographic non-light sensitive colloid layers and as screening dyes in photographic light-sensitive emulsion layers which are discharged quickly, completely, and irreversibly in photographic processing liquids including lith-type developers. The dyes have the formula:

Figure 1:
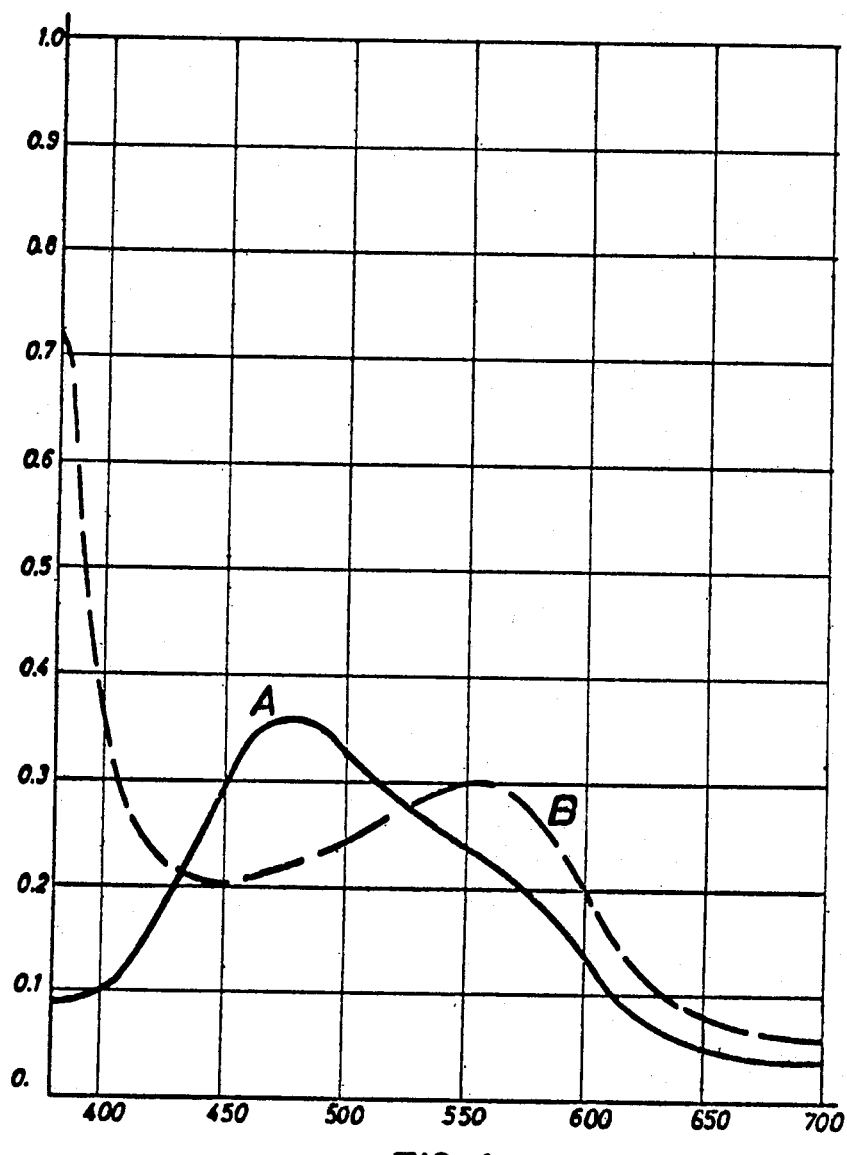

$$O=C\underset{\underset{R_2}{\overset{|}{N-C}}}{\overset{\overset{R_1}{\overset{|}{N-C}}}{\diagup}}\underset{\overset{|}{\underset{0}{\parallel}}}{\overset{\overset{O}{\parallel}}{\diagdown}}C=L_1-(L_2=L_3-)_{p-1}-Ar-Y$$

wherein $R_1$ stands for an alkyl group, an allyl group, a cycloalkyl group, an aralkyl group or an aryl group,
$R_2$ stands for hydrogen, an alkyl group, an allyl group, a cycloalkyl group, an aralkyl group or an aryl group,
each of $L_1$, $L_2$, and $L_3$ (the same or different) represents a methine group,
Ar represents an arylene nucleus or an arylene nucleus condensed to form a fused ring system,
p stands for 1 or 2, and
Y stands for a hydroxyl group, an alkoxy group, an alkylthio group or an amino group, the dyestuff molecule containing at least one carboxyalkyl or sulfoalkyl group in acid or salt form.

---

The present invention relates to new methine dyes, to their preparation, to their use in photographic elements as light screening dyes and to elements containing said dyes.

It is known, for many purposes, to incorporate light screening dyes into photographic elements. Such a light screening dye may be used as filter dye in a layer coated over one or more light-sensitive emulsion layers or between two emulsion layers, e.g. differently colour-sensitized emulsion layers, to protect the underlying light-sensitive emulsion layer(s) from the action of light of wavelength absorbed by such light screening dye or it may be used as screening dye in a light-sensitive emulsion layer for the purpose of modifying a light record in such emulsion layer or it may be used as antihalation dye in a layer not containing a light-sensitive substance known as antihalation layer situated on either side of the support carrying the light-sensitive emulsion layer(s).

Light screening dyes should meet severe demands in order to be useful in photographic elements. They should not affect the inherent sensitivity or spectral sensitivity of light-sensitive emulsions with which they may come into contact. They should have good absorption characteristics and should not give rise to fogging. Further they should be readily rendered ineffective i.e. decolourized or destroyed and removed, in at least one of the photographic processing liquids.

Numerous compounds have been employed as light screening dyes for the purposes given above. Many adversely affect the sensitivity of the light-sensitive emulsions with which they come into contact and others are unsuitable for certain applications in that they are not easily discharged or incompletely discharged in the processing solutions.

For instance, among the light screening dyes that are wdiely employed nowadays in photographic elements pyrazolon-oxonols and dyes obtained by condensation of pyrazolones with N-substituted p-aminobenzaldehydes or cinnamaldehydes are important representatives. However, many of these dyes have an important disadvantage in that they are unsuitable for use in photographic elements of the graphic arts type more particularly in the "lith"-type of photographic elements. Indeed, said pyrazolon-oxonols and cinnamylidene pyrazolones are incompletely decolourised in the special so-called "lith"-type of developers whereby said developers are easily stained (coloured).

By "lith"-type of developer is understood an aqueous developing solution containing as sole developing substance hydroquinone and as anti-oxidant a bisulphite addition compound of an aliphatic aldehyde or ketone e.g. formaldehyde bisulphite.

According to the present invention novel light screening dyes are provided for use as filter dyes and antihalation dyes in photographic non-light-sensitive colloid layers and as screening dyes in photographic light-sensitive emulsion layers which are discharged quickly completely and irreversibly in the photographic processing liquids even in the "lith"-type of developers.

The novel light screening dyes of the invention can be represented by General Formula I:

$$O=C\underset{\underset{R_2}{\overset{|}{N-C}}}{\overset{\overset{R_1}{\overset{|}{N-C}}}{\diagup}}\underset{\overset{|}{\underset{0}{\parallel}}}{\overset{\overset{O}{\parallel}}{\diagdown}}C=L_1=(L_2=L_3-)_{p-1}-Ar-Y$$

wherein:

Y stands for hydroxyl, alkoxy, alkylthio, amino or substituted amino e.g. dialkylamino such as dimethylamino and the group $$-N\diagdown_{(CH_2)_n-X}^{(CH_2)_n-X'}$$

wherein $n$ stands for 1, 2 or 3 and each of X and X' (the same or different) represents a cyano group, a carboxyl group, a sulpho group, a halogen atom, e.g. chlorine, an alkoxycarbonyl group, e.g. methoxycarbonyl, an aryloxycarbonyl group, an amino group, a substituted amino group, e.g. dimethylamino, a quaternary ammonium group, a $-SO_2R_3$ group wherein $R_3$ represents alkyl including substituted alkyl, aralkyl including substituted aralkyl or aryl including substituted aryl, p stands for 1 or 2, Ar represents an arylene nucleus including a substituted arylene nucleus and an arylene nucleus condensed to form a fused ring system, preferably however a phenylene or substituted phenylene radical, e.g. phenylene substituted with a lower alkyl group, a substituted lower alkyl group, an aryl group, a substituted aryl group, a hydroxyl group, an alkoxy group, a halogen atom such as a chlorine atom, a nitro group, an alkoxycarbonyl group, a carboxyl group, a cyano group, a sulpho group, an alkylsulphonyl group, a carbamoyl group, a carbonamido group, a sulphamoyl group, a sulphonamido group, an amino group, a mercapto group, or an alkylthio group, and each of $L_1$, $L_2$, and $L_3$ (the same or different) represents a methine group including a substituted methine group e.g. methine substituted by alkyl, aralkyl or aryl, $R_1$ stands for alkyl including substituted alkyl, e.g. carboxylalkyl and sulphoalkyl, allyl, cycloalkyl, aralkyl including substituted aralkyl or aryl including substituted aryl, and $R_2$ stands for hydrogen, alkyl including substituted alkyl e.g. carboxyalkyl and sulphoalkyl, allyl, cycloalkyl, aralkyl including substituted aralkyl or aryl including substituted aryl, the dyestuff molecule containing at least one carboxyalkyl- or sulphoalkyl group in acid or salt form e.g. as alkali metal salt, ammonium salt, alkaline earth metal salt, organic amine such as pyridine salt, etc.

The dyes of use according to the present invention meet the severe demands that are made on antihalation dyes, filter dyes and screening dyes for photographic silver halide materials, in other words, they do not desensitize or fog a light-sensitive silver halide emulsion, are well miscible with a photographic colloid, e.g. gelatin, can easily be incorporated into the photographic material, possess an intensive tinctorial power and are discharged quickly, complete and irreversibly without formation of coloured degradation products in alkaline or acid reducing mediums such as alkaline photographic developing baths including those of the "lith"-type as well as in acid fixing baths.

By appropriate choice of the substituents the characteristics of the novel light screening dyes of the invention as regards absorption range, solubility and fastness to diffusion can be adapted to the necessities.

The following are representative screening dyes of the present invention. However, it is to be understood that the invention is not limited to these specific screening dyes.

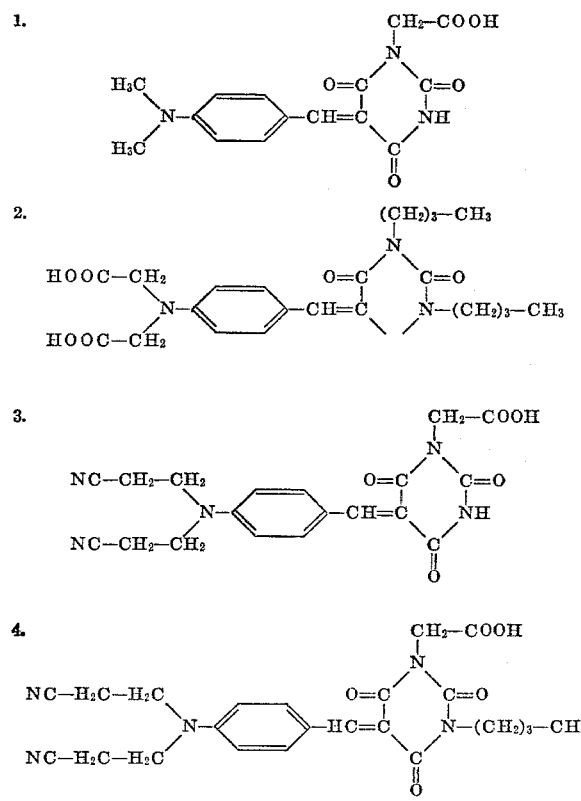

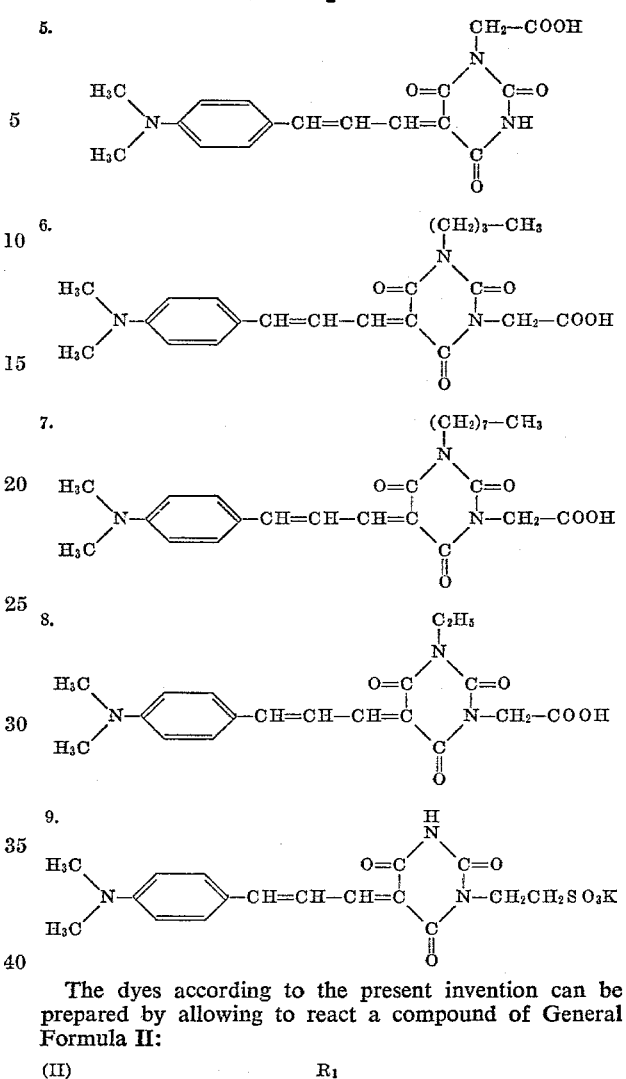

The dyes according to the present invention can be prepared by allowing to react a compound of General Formula II:

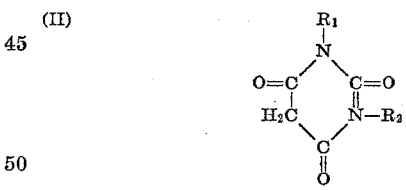

with a compound of General Formula III:

(III)    Y—Ar—(L_3=L_2—)_{p-1}L_1=O wherein $R_1$, $R_2$, $L_1$, $L_2$, $L_3$, Ar, Y, and $p$ have the same significance as above.

The reaction can be caried out by heating a mixture of compounds II and III in the presence of a basic condensing agent such as sodium acetate or pyridine. The reaction can also occur in an inert diluent such as methanol, ethanol, ethylene glycol monomethyl ether, acetonitrile, dimethyl sulphoxide, tetrahydrothiophene-1,1-dioxide or dimethyl formamide, either or not in the presence of a basic condensing agent.

The intermediates of Formula II, can be prepared without difficulty as known in the art by reaction of the appropriate urea with malonic acid in the presence of acetic anhydride. The said urea can be obtained by reaction in an inert solvent such as benzene of an organic isocyanate or an inorganic cyanate such as potassium cyanate with a primary amine.

The aldehydes of Formula III, wherein $p=1$ can be prepared from the corresponding anilines, phenols, alkyl phenyl ethers and alkyl phenyl thioethers, according to the Vilsmeier and Haack reaction (Ber. 60, 119, 1927)

using dimethyl-formamide as formylating agent whereas those wherein $p=2$ can be prepared analogously to the Vilsmeier reaction, as described by C. Jutz, Ber. 91, 850 (1958) with N-methyl-anilinopropene (1)-al (3) and the appropriate analines, phenols, alkyl phenyl ethers and alkyl phenyl thioethers. The latter compounds can be prepared by methods well known in organic chemistry.

The following preparations illustrate how the novel light-screening dyes of the invention can be prepared.

PREPARATION 1—DYESTUFF 2

A mixture of 2.4 g. of N,N-dibutylbarbituric acid (prepared as described hereinafter), 2.4 g. of p-biscarboxymethylaminobenzaldehyde and 1.4 g. of crystalline sodium acetate in 50 ml. of glacial acetic acid is boiled for 30 minutes. After refrigeration overnight yellow dye having Formula 2 is obtained and separated by filtration.

Yield: 3.5 g. (76%)
Melting point: above 260° C.

The N,N'-dibutylbarbituric acid is prepared by allowing to react equimolecular amounts of N,N'-dibutylurea (melting point: 74° C.) and malonic acid in the presence of acetic acid and acetic anhydride. According to the method described by Clark-Lewis and Thompson (J. Chem. Soc. 1959, 1628) the reaction mixture is evaporated under reduced pressure and the residue boiled for 3 hours with 17% of hydrochloric acid in water in order to hydrolyze any 5-carboxy-acetyl substituted barbituric acid. By refrigeration of the reaction mixture a crystalline product is obtained.

Melting point: 49° C.

PREPARATION 2: DYESTUFF 4

To a solution of 0.7 g. (0.003 mole) of N-butyl-N'-carboxymethylbarbituric acid (prepared as described hereinafter) in 15 ml. of dry ethanol 0.68 g. (0.003 mole) of p-biscyanoethylaminobenzaldehyde is added. The mixture is boiled for 1 hour on a water bath. The deep orange solution is left cooling overnight and a yellow dye crystallizes. After filtration, washing with ether and drying 1.2 g. (92%) of the dye having Formula 4 is obtained.

The N-butyl-N'-carboxymethylbarbituric acid can be prepared according to the method described in French patent specification 1,290,430 filed Apr. 12, 1961 by Kodak. However, better yields are frequently obtained in this type of reaction when the temperature during the hydrolysis of the intermediate N-ethoxy-carbonyl-methyl-N-alkylbarbituric acid with aqueous sodium hydroxide is not allowed to exceed 60° C. Excellent results can also be obtained by hydrolysis with 17% hydrochloric acid in water.

PREPARATION 3: DYESTUFF 9

In a mixture of 350 ml. of ethylene glycol monomethyl ether and 70 ml. of water, 51 g. of crude N-2'-sulphoethyl barbituric acid potassium salt and 33 g. of p-N,N-dimethylamino-cinnamic aldehyde are dissolved. The solution is refluxed for 1 hour whereupon it is cooled and 100 ml. of water is added to avoid crystallization of any unreacted barbituric acid. The reaction mixture is left standing overnight in the refrigerator whereupon the dye formed is filtered off and two times thoroughly washed with 250 ml of boiling acetone.

Yield: 16.6 g. (21%).

The N-2'-sulphoethylbarbituric acid can be prepared as follows:

In a solution of 148 g. of malonic acid in 236 ml. of acetic acid, 244 g. of 2-sulphoethylurea potassium salt, prepared by treating a concentrated aqueous solution of taurine with solid potassium cyanate, are suspended. The mixture is heated to 60–70° C. whereupon 472 ml. of acetic anhydride are added dropwise with stirring. The temperature is gradually raised to 90° C. After having been kept for 6 hours at 90° C. the reaction mixture is allowed to cool overnight. The precipitate formed is filtered off and digested with 1 litre of acetic acid. The product is filtered off, washed with ether and dried. The crude potassium salt of N-2'-sulphoethylbarbituric acid so obtained weighs 193 g.

The dyes having Formulae 1, 3, 5, 6, 7 and 8 are prepared in a similar way.

The absorption characteristics of the dyes are listed in the following table.

| Dyestuff of formula | Absorption maximum (nm.) | $\epsilon \cdot 10^{-4}$ |
| --- | --- | --- |
| 1 | a 470 | 5.52 |
| 2 | b 444 | 3.40 |
| 3 | b 445 | 4.97 |
| 4 | a 442 | 2.44 |
| 5 | a 540 | 4.60 |
| 6 | a 538 | 5.70 |
| 7 | a 533 | 5.58 |
| 8 | a 536 | 6.01 |
| 9 | c 578 | 3.66 | a Measured in methanol.
b Measured in ethylene glycol monomethyl ether.
c Measured in water.

The dyestuffs according to the invention can be applied in any photographic material based on light-sensitive silver halide, when easily dischargeable dyestuffs are desired or necessary. Examples of applications of these dyes are: in an antihalation layer e.g. between the support and a light-sensitive silver halide emulsion layer or at the back of the support, in a filter layer above or between the light-senstive silver halide emulsion layers or as screening dye in a light-sensitive layer. Said dyestuffs when used as screening dye in a light-sensitive silver halide emulsion layer do not or practically do not decrease the inherent and/or spectral sensitivity of the silver halide.

The dyes according to the present invention can be incorporated into a photographic material according to any technique known to those skilled in the art. The following is a mere description of some appropriate technique and has no intention of limiting the scope of the invention.

An alkali salt of a dye according to the present invention is dissolved in water, whereupon the solution obtained is dispersed, occasionally in the presence of a wetting agent, in a hydrophilic colloid composition, preferably a gelatin solution.

Layers with broad spectral absorption, in which the dye is fast to diffusion, can be obtained provided the dye contains only carboxyl group(s), and no sulphonic acid group when one equivalent of a water-soluble acid, e.g., hydrochloric acid or acetic acid, or one equivalent of a water-soluble salt, which forms water-insoluble salts with the dye, e.g. silver nitrate or lead nitrate, is added to the hydrophilic colloid composition before, during or after the addition of the aqueous solution of the alkali salts of the dyes.

The dyes according to the present invention that are difficultly soluble in water can also be incorporated in a form fast to diffusion and with broad spectral absorption, when using a dispersion of said dye in a hydrophilic colloid, obtained in one of the following ways:

(a) A solution of dye, in a suitable organic water-miscible and/or water-immiscible solvent, is dispersed in a hydrophilic colloid solution, preferably an aqueous gelatin solution, occasionally in the presence of a wetting agent. For more details about such dispersing techniques, there can be referred to United Kingdom patent specifications 791,219 filed Nov. 19, 1955 by Kodak, 1,098,594, 1,099,-414, 1,099,415, 1,099,416, 1,099,417 all filed Jan. 25, 1965 by Gevaert-Agfa N.V., to United States patent specification 2,304,940 of Leopold D. Mannes and Leopold Godowsky, issued Dec. 15, 1942 and to French patent specification 1,555,663 filed Dec. 20, 1968 by Gevaert-Agfa N.V., (b) A suspension of the dye in water is finely ground in a mill, e.g. a colloid ball mill, occasionally in the presence of a wetting agent; the hydrophilic colloid can be added before or after the milling process, (c) Difficultly water soluble dyes according to the above General Formula I are dissolved in the form of their alkali metal salts in a water-immiscible solvent whereupon the solution is dispersed in water or aqueous hydrophilic colloid and the solvent is removed. The resulting solution is then admixed with the hydrophilic colloid coating composition. For more details about the technique just described there can be referred to Belgian patent specification 722,026 filed Sept. 10, 1968 by Gevaert-Agfa N.V.

The colloids or mixtures of colloids used in the hydrophilic colloid compositions, into which the dyes are dispersed may be of any type as commonly used in photographic materials e.g. gelatin, casein, polyvinyl alcohol, poly-N-vinyl pyrrolidone, carboxymethylcellulose, sodium, alginate, etc., gelatin being however favoured. Before coating, other ingredients, such as coating aids and hardening agents, may be added to the dye dispersions.

The following examples illustrate more particularly the use of the dyes according to the present invention.

Example 1

A coating solution of the following composition is prepared:

| | |
|---|---|
| Inert gelatin _____ g__ | 50 |
| Dyestuff 7 (from a solution in water in the presence of 1 equivalent of KOH) _____ g__ | 1 |
| Saponine _____ g__ | 1.25 |
| Formaldehyde (in 4% aqueous solution) ____ml__ | 1 |
| Water to make 1000 ml. | |

The pH of the coating solution is adjusted to 6.1. The solution is coated on a subbed cellulose triacetate support pro rata of 50 g./sq. m. so that 2.5 g. of gelatin and 50 mg. of the dyestuff are present per sq. m.

A red gelatin layer is obtained, the spectral absorption characteristics of which are represented in FIG. 1A.

The dyestuff in the gelatin layer described shows an excellent fastness to diffusion so that it can be used as an antihalation undercoat for an optically sensitized emulsion layer coated over the said dyestuff layer. No desensitization is measured. The dyestuff discolours completely during conventional photographic processing no matter whether it is black and white processing, colour negative processing or colour positive processing. The dyestuff also discolours completely in the "Lith"-type of developers.

Example 2

In a similar way as described in Example 1, a coating solution is prepared that contains 5.4 g. of the dyestuff 5. The dyestuff is now added from a dispersion in 2% aqueous gelatin, said dispersion being formed by means of a swinging mill with a concentration of 2.5 g. of dyestuff in 100 g. of dispersion.

The solution is coated on a subbed cellulose triacetate support in such a way that 2.5 g. of gelatin and 270 mg. of dyestuff are present per sq. m.

A violet layer is obtained the spectral absorption characteristics of which are represented in FIG. 1B.

The fastness to diffusion of the dyestuff in this layer is not as good as in Example 1, but the layer can be perfectly used as antihalation back layer. It discolours completely during photographic processing, even in lith-type of developers.

Example 3

A coating solution is prepared as follows:

| | G. |
|---|---|
| Inert gelatin _____ | 20 |
| Dyestuff 2 (from a dispersion in 2% aqueous gelatin at a concentration of 2.5% by weight, said dispersion being prepared by means of a swinging mill) __ | 9.6 |
| Sodium-2-methyl-7-ethyl-undecane sulphate _____ | 1 |
| Water to make 1000 ml. | |

Figure 2:
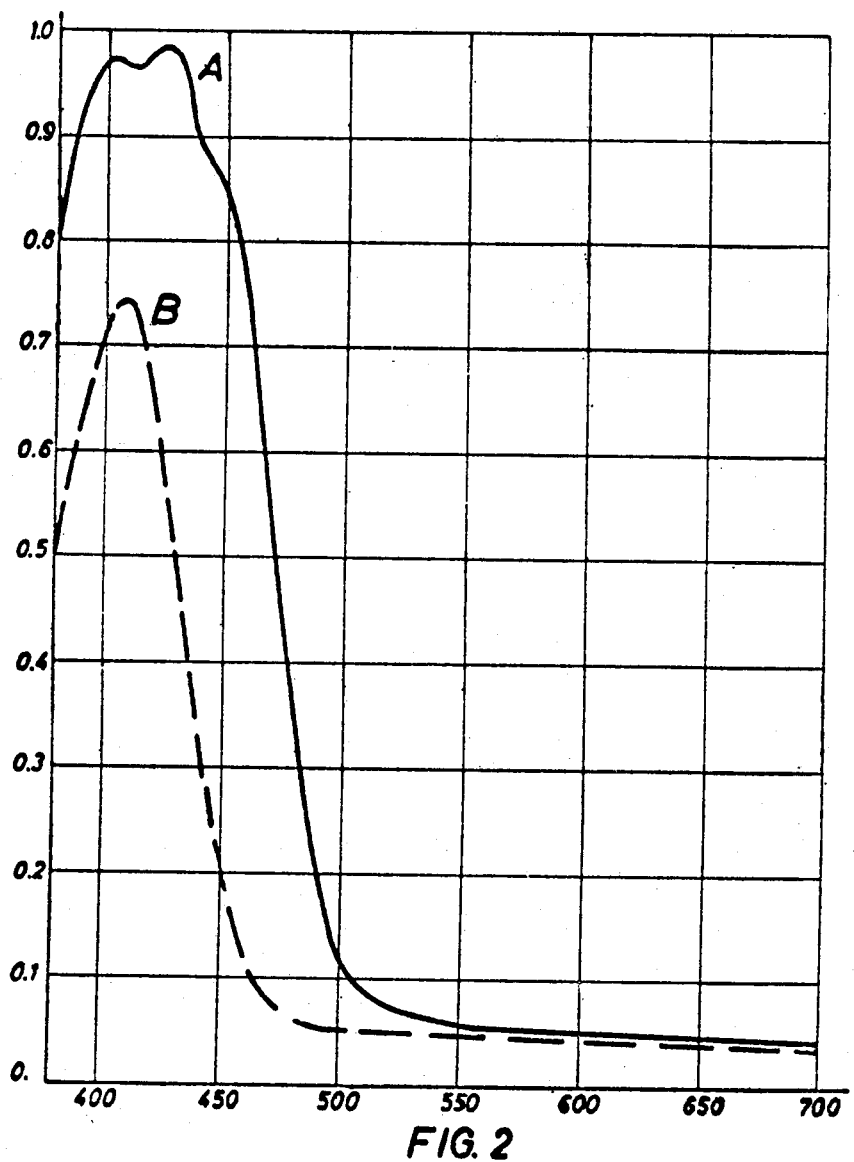

When coated pro rata of 1 g. of gelatin and 0.48 g. of dyestuff per sq. m. a layer is obtained the spectral absorption characteristics of which are represented in FIG. 2A.

The layer obtained can be used as a yellow filter layer, with excellent fastness to diffusion, between the green-sensitive silver halide emulsion layer and the blue-sensitive silver halide emulsion layer of a photographic multi-layer colour material. The dystuff is completely discoloured during normal photographic colour processing.

Example 4

In a similar way as described in Example 3 a coating solution is prepared with 7 g. of dyestuff 1. This dyestuff is added from a dispersion in 2% aqueous gelatin at a concentration of 2% by weight, said dispersion being prepared by means of a swinging mill.

When coated pro rata of 1 g. of gelatin and 0.35 g. of dyestuff per sq. m. a yellow layer is obtained the absorption characteristics of which are represented in FIG. 2B.

The dyestuff discolours rapidly and completely when treated in common photographic processing baths and in lith-type of developers.

Example 5

In a similar way as described in Example 1, a coating solution is prepared comprising 5.6 g. of dyestuff 8.

The dyestuff is added from a dispersion in 2% aqueous gelatin formed by means of a swinging mill with a concentration of 2.5 g. of dyestuff in 100 g. of dispersion.

The solution is coated on a subbed polyester support in such a way that 2.5 g. of gelatin and 280 mg. of dyestuff are present per sq. m.

Figure 3:
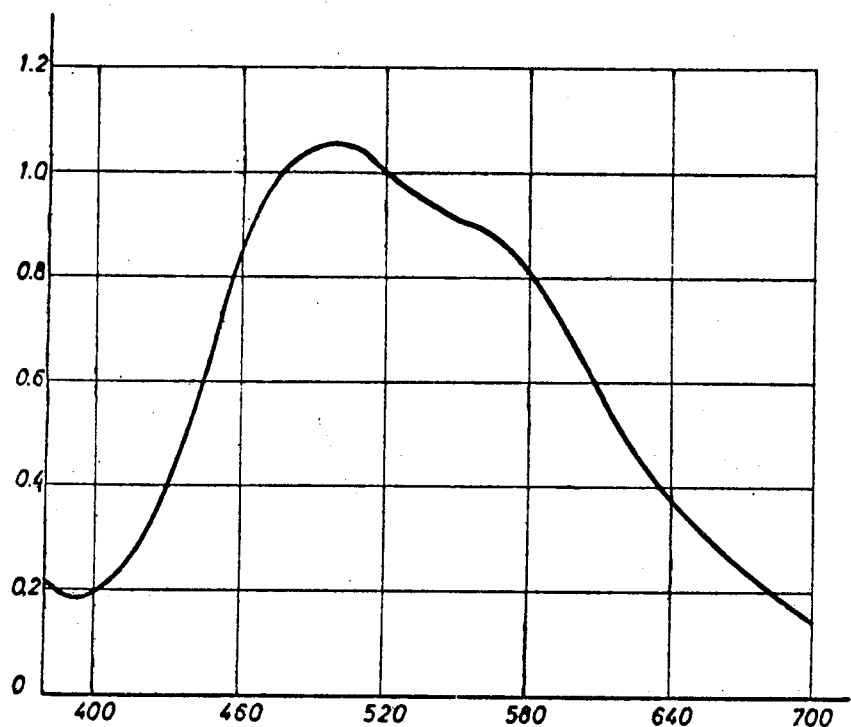

A red-violet layer is obtained the spectral absorption characteristics of which are represented in FIG. 3.

The dyestuff in the gelatin layer described shows an excellent fastness to diffusion so that it can be used as an antihalation undercoat for an optically sensitized silver halide emulsion layer, e.g. an orthochromatic graphic emulsion layer, coated over the said dyestuff layer. The dyestuff discolours completely during conventional processing and during the typical "lith"-processing.

We claim:

1. A colloid composition containing a dye corresponding to the following general formula:

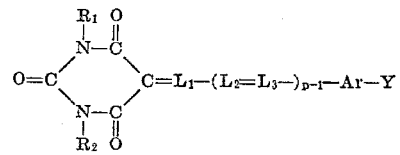

wherein:

$R_1$ stands for an alkyl group, an allyl group, a cycloalkyl group, an aralkyl group or an aryl group, $R_2$ stands for hydrogen, an alkyl group, an allyl group, a cycloalkyl group, an aralkyl group or an aryl group, each of $L_1$, $L_2$ and $L_3$ represents a methine group, Ar represents an arylene nucleus or an arylene nucleus condensed to form a fused ring system, $p$ stands for 1 or 2, and Y stands for a hydroxyl group, an alkoxy group, an alkylthio group or an amino group, the dyestuff molecule containing at least one carboxy alkyl or sulfoalkyl group in acid or salt form.

2. A colloid composition according to claim 1 wherein Y stands for an amino group of the formula

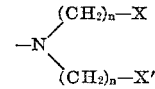

wherein $n$ stands for 1, 2 or 3 and each of X and X' (the same or different) represents a hydrogen atom, a cyano group, a carboxyl group, an alkoxycarbonyl group, an aryloxy carbonyl group, a halogen atom, a sulpho group, an amino group, a quaternary ammonium group, an —$SO_2R_3$ group wherein $R_3$ represents an alkyl group, an aralkyl group or an aryl group.

3. A colloid composition according to claim 1, wherein Ar stands for a phenylene group.

4. A colloid composition according to claim 1 wherein $R_1$ and/or $R_2$ stands for carboxyalkyl or sulphoalkyl in acid or salt form.

5. A colloid composition according to claim 1, wherein said composition forms a water-permeable colloid layer of a photographic light-sensitive element.

6. A colloid composition according to claim 1 wherein said composition forms a water-permeable colloid layer shielding at least one optically sensitized silver halide emulsion layer of a light-sensitive photographic multilayer silver halide colour element for the light of wavelength absorbed by the said dye.

7. A colloid composition according to claim 1, wherein said composition forms an antihalation layer of a light-sensitive photographic element containing at least one silver halide emulsion layer.

8. A colloid composition according to claim 1, wherein said composition forms a silver halide emulsion layer of a light-sensitive photographic element.

References Cited
UNITED STATES PATENTS

| | | | |
|---|---|---|---|
| 2,089,729 | 8/1937 | Brooker | 260—240.3 |
| 3,132,942 | 5/1964 | Stewart | 96—1.7 |
| 3,440,051 | 4/1969 | Bailey | 96—84 |
| 3,497,502 | 2/1970 | Taber et al. | 96—84 |
| 3,531,287 | 9/1970 | Salesin | 96—84 |

J. TRAVIS BROWN, Primary Examiner

U.S. Cl. X.R.

260—240, 240.9